W. A. UTZMAN.
LIQUID FUEL FILTER.
APPLICATION FILED JULY 22, 1912.

1,052,629.

Patented Feb. 11, 1913.

WITNESSES:
D. C. Walter
E. E. Thomas

INVENTOR.
Winfield A. Utzman,
By Owen & Owen,
His attys.

UNITED STATES PATENT OFFICE.

WINFIELD A. UTZMAN, OF TOLEDO, OHIO.

LIQUID-FUEL FILTER.

1,052,629.

Specification of Letters Patent.  Patented Feb. 11, 1913.

Application filed July 22, 1912.  Serial No. 710,902.

*To all whom it may concern:*

Be it known that I, WINFIELD A. UTZMAN, a citizen of the United States, and a resident of Toledo, in the county of Lucas and State of Ohio, have invented a certain new and useful Liquid-Fuel Filter; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates in general to liquid fuel filters, and particularly to filters of the class adapted to be inserted in the connections between the fuel reservoirs and the carbureters of automobiles, air ships and the like to separate water and other foreign matter from the fuel before it is delivered to the carbureter, but is not restricted to such use as it may be used in any connection for which it may be adapted or appropriate.

One of the principal objects of this invention is to provide a liquid fuel filter wherein the delicate filtering parts will be effectively protected from injury and all danger of damage to the filtering medium obviated when the drainage passage is cleaned by thoughtless or careless operators.

A further object of the invention is to provide a liquid fuel filter wherein the liquid in contact with the filtering medium will be maintained in the quietest possible state and the usual agitation or surging of the liquid within the chamber prevented from forcing water contained in the fuel through such medium.

A further object of the invention is the provision of a simple and efficient filter of this character which is inexpensive of construction, and which embodies features that enhance the practicability and commercial value thereof.

Figure 1:
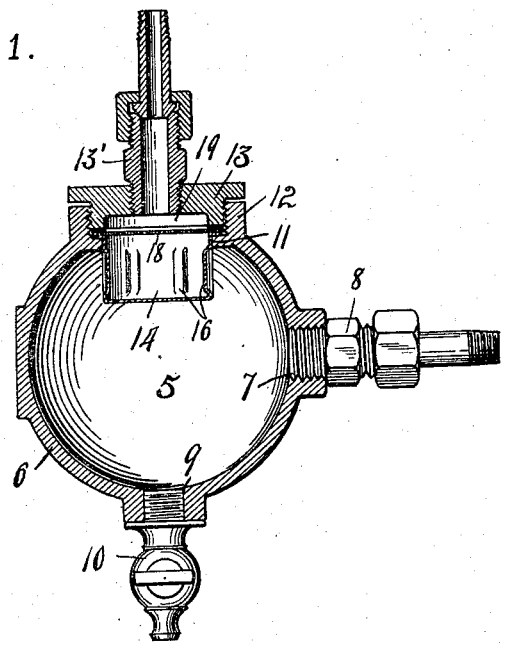
Figure 2:
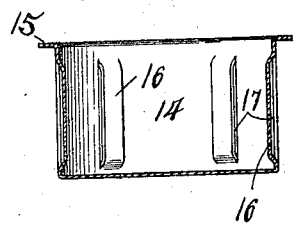

The invention is fully described in the following specification, and while, in its broader aspect, it is capable of embodiment in numerous forms, a preferred embodiment thereof is illustrated in the accompanying drawings, in which, Figure 1 is a central vertical cross-section of a filter embodying the invention, and Fig. 2 is an enlarged central vertical section of one form of protector means employed.

Referring to the drawings, 5 designates a chamber, which is preferably, but not necessarily, formed of the hollow substantially spherical shell 6 having an inlet port 7 in its side, in which a nipple 8, having suitable connection with a tank or other source of liquid fuel supply is threaded, and having a drainage port 9 in its bottom in which a petcock 10 is secured to facilitate a draining off of the water and solid matter which has been retained in the chamber.

The shell top is provided with a filter receiving opening 11, and surrounding this in spaced relation thereto is an upstanding annular flange or housing 12, which is internally threaded to receive a closure member 13. An outlet nipple or pipe 13' is threaded or otherwise suitably attached to the closure member and is intended to lead to a carbureter which is located in the fuel supply system therewith.

The filter, in which the major features of my invention reside, consists primarily in a cup-shaped cage or protector 14, which is preferably of cylindrical form with its bottom closed and of imperforate construction and with its top open. This cage or protector has its top edge provided with an outwardly projecting flange 15 for resting upon the outer side of the shell within the flange 12. The side wall of the cage 14 is provided therearound with a plurality of longitudinally-disposed pairs of slits and the material between these slits is pressed preferably inwardly, as indicated at 16, to provide fine slots 17 between their edges and the body of the wall, as best shown in Fig. 2. It is found in practice that the provision of these narrow slots permits gasolene to pass freely therethrough from the chamber 5 into the interior of the cage 14 but prevents the passage therethrough of water or solid matter, thus providing an efficient cleaning means for the liquid fuel. A fine meshed screen 18, for effecting a further filtering of the fuel before passing to the carbureter, is disposed over the top or open end of the cage 14 with its marginal edge resting upon the cage flange 15, being held thereto by the pressure of the inner annularly flanged edge of the closure member 13 when screwed into the shell flange 12. The closure flange, in addition to holding the screen 18 to its seat, also retains the body of the closure spaced from the screen to form a chamber 19 therebetween, as shown.

It is readily apparent that the provision of the cage 14 intermediate the chamber 5 and its outlet serves to separate water and solid matter from the fuel before coming in contact with the auxiliary screening member 18, thus preventing a clogging of such screen. It will also be understood that the solid or imperforate bottom of the cage 14 will prevent liability of perforation or injury to the filtering screen, or screens should more than one be employed, by the insertion of some sharp or pointed instrument into the pet-cock or bottom clean-out opening of the shell for the purpose of securing a drainage through solid matter which has accumulated in the chamber bottom. Should water which is present in the fuel, accumulate to such an extent within the chamber 5 as to have contact with the imperforate cage bottom such bottom will prevent the water from entering the interior of the cage and from having contact with the screen 18. It is also found that without some such protector means as this the agitation of the liquid within the chamber 5 will cause such a surging and working of the water against the customary filtering screen as to force the water therethrough, thus rendering a screen alone inefficient as a water separating medium. Even should some water enter the interior of the cage, the cage will prevent such an agitation of the liquid in contact with the screen as to prevent a forcing of the water therethrough with the fuel.
While I have shown and described a single embodiment of my invention, it will be understood that the invention is not limited to any specific construction, form or arrangement of the parts except in so far as such limitations are specified in the claims.

Having thus described my invention, what I claim as new and desire to secure by Letters Patent, is,—

1. In a filter, a casing having inlet and outlet openings, a filtering medium disposed within the casing between said inlet and outlet openings to divide the interior of the casing into inlet and outlet chambers, and a cage projected into the inlet chamber from adjacent to the edge of the filtering medium and having its side walls provided with narrow slots.

2. In a filter, a casing having inlet and outlet passages and a drainage passage, a filtering medium disposed within said casing and dividing it into inlet and outlet chambers, and a protecting cage projecting within the inlet chamber from adjacent to said filtering medium and having its sides provided with fluid passages and the part thereof which is adjacent to the drainage passage of imperforate construction.

3. In a filter, a spherical casing having inlet and outlet passages and a drainage passage, filtering means separating the outlet passage from the inlet and drainage passages, and a sheet metal cage projecting from said means toward the drainage passage and having portions thereof of perforate construction and the part thereof adjacent to the drainage passage of imperforate construction, liquid from the inlet passage being required to pass through said cage before passing through the filtering means.

4. In a filter, a casing having an inlet passage, a drainage passage and a shouldered opening in different parts thereof, a protector cage projected into the interior of the casing through said opening and having a part engaging over said shoulder, filtering means disposed in said opening without said cage, and means holding said means and cage in position and forming a restricted outlet passage from the interior of the casing, said cage serving to protect the filtering means from injury by the introduction of implements into said drainage passage.

5. In a liquid fuel filter, a fuel chamber, a filtering medium disposed therein and a cage separating the chamber from said medium, said cage being of cup shape with its sides formed with laterally depressed portions forming narrow slots and having its bottom imperforate.

6. In a liquid fuel filter, a chamber having a filter receiving aperture, a cage supported in said aperture, a side of said cage having a pair of slits therein, the material between the slits being bent slightly away from the plane of the said side to permit the liquid fuel to pass into the cage and to prevent solid matter and at least a portion of the water contained in the liquid fuel from passing therethrough, and a filtering medium disposed in said aperture over said cage.

In testimony whereof, I have hereunto signed my name to this specification in the presence of two subscribing witnesses.

WINFIELD A. UTZMAN.

Witnesses:
C. W. WATSON,
C. W. OWEN.